(12) United States Patent
Bowman (10) Patent No.: US 7,806,638 B1
(45) Date of Patent: Oct. 5, 2010

(54) INSULATED AIR TUBE FOR A REINSTATEMENT CUTTING MACHINE

(76) Inventor: Thomas W. Bowman, 1575 Braggtown Rd., East Berlin, PA (US) 17316

( * ) Notice: Subject to any disclaimer, the term of this patent is extended or adjusted under 35 U.S.C. 154(b) by 0 days.

(21) Appl. No.: 12/150,430

(22) Filed: Apr. 28, 2008

Related U.S. Application Data

(63) Continuation of application No. 11/362,615, filed on Feb. 25, 2006, now Pat. No. 7,364,392, which is a continuation-in-part of application No. 11/360,261, filed on Feb. 23, 2006, now Pat. No. 7,249,918.

(60) Provisional application No. 60/655,704, filed on Feb. 23, 2005.

(51) Int. Cl.
*B23C 1/00* (2006.01)
*B23C 1/20* (2006.01)
*B23Q 11/14* (2006.01)

(52) U.S. Cl. ........................ 409/143; 409/135; 166/55.7

(58) Field of Classification Search ................. 409/143, 409/135, 231, 235; 166/55, 55.2, 55.7; 15/104.05, 15/104.09; 408/130, 124
See application file for complete search history.

(56) References Cited

U.S. PATENT DOCUMENTS

| | | | |
|---|---|---|---|
| 4,197,908 A * | 4/1980 | Davis et al. | 166/55 |
| 4,964,759 A | 10/1990 | Guzzetta et al. | |
| 4,986,314 A | 1/1991 | Himmler | |
| 5,088,553 A | 2/1992 | Ralston et al. | |
| 5,368,423 A | 11/1994 | Hanna | |
| 5,899,796 A | 5/1999 | Kamiyama et al. | |
| 6,386,797 B1 | 5/2002 | Gearhart | |
| 7,249,918 B1 * | 7/2007 | Bowman | 409/132 |
| 7,364,392 B1 * | 4/2008 | Bowman | 409/143 |

* cited by examiner

*Primary Examiner*—Erica E Cadugan
(74) *Attorney, Agent, or Firm*—Roger N. Chauza, P.C.

(57) ABSTRACT

A reinstatement cutting machine having an air tube formed therethrough for carrying pressurized air to drive a cutting tool. The air tube is insulated to prevent condensation within the reinstatement cutting machine due to temperature changes caused by the pressurized air passing through the air tube. In a preferred embodiment, the air tube is insulated with a tubular member constructed of an insulating material.

17 Claims, 11 Drawing Sheets

FIG. 11

INSULATED AIR TUBE FOR A REINSTATEMENT CUTTING MACHINE

RELATED APPLICATIONS

This non-provisional patent application is a continuation patent application of U.S. application Ser. No. 11/362,615, filed Feb. 25, 2006, now U.S. Pat. No. 7,364,392, entitled "Motor Module for a Reinstatement Cutting Machine," which is a continuation-in-part application of U.S. application Ser. No. 11/360,261, filed Feb. 23, 2006, now U.S. Pat. No. 7,249,918 entitled "Cutting Machine," which claims the benefit of provisional patent application Ser. No. 60/655,704, filed Feb. 23, 2005, the disclosures of which are all incorporated herein by reference.

TECHNICAL FIELD OF THE INVENTION

The present invention relates in general to reinstatement cutting machines, and more particularly to such type of machines employing pressurized air passage tubes therein.

BACKGROUND OF THE INVENTION

Many different types of cutting tools are available for use in a variety of applications. In most industrial situations, either the cutter is rotated or otherwise moved, and the workpiece is maintained stationary. In other situations, the cutter is stationary and the workpiece is rotated or otherwise moved. In yet other applications, both the cutter and the workpiece may be moved at the same time.

Reinstatement cutting machines are special applications where a cutter is utilized for cutting an opening in a plastic liner installed in a deteriorated underground pipe, e.g., a main. The reinstatement cutting machine is moved through the lined main until it is at a location where a lateral pipe connects to the main pipe. The plastic liner previously installed in the main covers the opening to each lateral pipe. The function of the reinstatement cutting machine is to cut a circular opening in the plastic liner where the lateral pipe opens into the main pipe. This operation reinstates the ability of fluids to flow from the lateral pipe into the lined main pipe.

Cutters mounted to reinstatement cutting machines generally rely on three degrees of motion, including a radial motion with regard to the axis of the main pipe, rotational movements in a plane orthogonal to the axis of the main pipe, and axial movements along the axis of the main pipe. Often, the longitudinal movements of the reinstatement cutting machine itself provide one direction of movement of the cutter. The bit of the cutting machine can be mounted to a platform that provides radial movement of the bit toward the sidewall of the liner, as well as rotational movements during the cutting operation. In other types of cutting machines, the platform can be constructed to provide all three types of movements of the bit to accomplish the cutting of a hole in the liner to provide an opening to the lateral. Because the reinstatement cutting machine is moved along the liner of the main, it cannot be directly controlled or observed. Accordingly, remote controls are used to remotely control the various movements of the cutting machine. Video Cameras are typically used ahead of the cutting machine to allow the cutting operation to be viewed remotely by the operator of the remote controls.

As can be appreciated, when the reinstatement cutting machine is moved into an underground pipe, the entire mechanism, including the cutter itself, must be very reliable. Otherwise, the entire apparatus must be removed from the pipe, which is not often easy, as a cutter may fail or the mobility of the cutting machine may be lost, while the bit is extended radially into the sidewall opening of the main pipe. The bit mechanism is sometimes destroyed during the forceful removal of the reinstatement cutting machine from the main pipe. In other situations, the reinstatement cutting machine and any associated camera equipment must be removed from the main pipe if the bit of the cutter fails. The bit can fail if it becomes dull, broken or becomes loose from its mounting chuck. As can be appreciated, the more complicated a cutter becomes, the more likely a failure will occur. In addition, the more complicated the design and construction of a cutter, the more costly the device becomes.

The various assemblies of a reinstatement cutting machine are generally driven by electrical motors. The motors are housed in a case with the other apparatus and sealed so that moisture and liquids cannot enter in to the internal working of the machine. However, in the event a seal becomes defective, the life of a motor can be seriously shortened. While the gear assemblies may be damaged by moisture, such damage may be repairable, whereas, moisture that has leaked into a motor may damage the same beyond repair. The result is that the machine is required to be removed from the underground pipe and disassembled to replace the defective motor. One solution may be to employ water-proof motors. However, this solution is extremely expensive.

Air pressure is utilized in many reinstatement cutting machines to drive the cutting bit. In some machines, the air pressure is coupled directly to the air-driven motor. This is the case in reinstatement cutting machines of the type that move in a pipe main with the cutter mounted to the back of the reinstatement machine. Here, the air pressure hose is towed by the reinstatement cutting machine and coupled directly to the air-driven motor. In other situations, the reinstatement cutting machine moves in the pipe main with the cutter mounted to the front of the machine. In this case, the air pressure hose is towed by the machine, but the air pressure must be routed either around the machine, or through the machine to the front-mounted air-driven cutter motor. When routing the air pressure around the reinstatement cutting machine, a separate metal pipe is generally attached to the outer surface of the reinstatement cutting machine to carry the air pressure from the back of the machine to the front-mounted cutter motor. This is acceptable, but the external air pressure tube increases the effective diameter of the machine, thereby limiting the diameter of the main pipe that can be reinstated.

In other types of reinstatement cutting machines, air pressure is coupled through the machine itself from the back thereof to the front-mounted cutter motor. This solves the problem attendant with external-mounted air pressure tubes, but creates other problems. One problem created with the use of internal air passages is that of condensation that forms internal to the cutting machine and exposure of the same to the motors, bearings and gear apparatus. This is believed to be the result of the Bernoulli principle, in which the change of velocity of the pressurized air creates temperature changes in the material that conducts the air pressure. In other words, when the velocity of the air carried by the internal passage changes due to the starting and stopping of the air-driven motor, the metal parts of the machine affected by the temperature change may allow moisture to condense thereon. Metal parts that have an elevated operating temperatures, such as motors, may accelerate the condensation of the moisture in the air that is captured in the cutting machine. The collection of moisture on the various components of the cutting machine, especially motors, substantially reduces the life and reliability of the cutting machine.

From the foregoing, it can be seen that a need exists for a motor module which houses all of the electrical motors utilized to drive the components of the cutting machine. Another need exists for a motor module that is separate and sealed from the other apparatus of the cutting machine. Yet another need exists for a technique that enables air pressure to be coupled internal to the cutting machine without the attendant problems of condensed moisture.

SUMMARY OF THE INVENTION

In accordance with the principles and concepts of a preferred embodiment of the invention, there is disclosed a cutting machine constructed with a main housing that supports the various gears and associated apparatus for moving a cutting bit, and a separate motor module sealed from the main body. The motor module is fastened to the main body of the cutting machine.

In accordance with another feature of the invention, the motor module can be easily removed from the main body to repair any parts thereof, without disassembly of the components in the main body of the cutting machine.

With regard to another feature of the invention, the motor module includes a mounting plate to which the various motors are mounted. The mounting plate is fastened to a bulkhead which, in turn is fastened to the end of the main body via seals. The motor shafts are also sealed to the bulkhead. A rear housing motor cover is fastened to and sealed to the bulkhead. Lastly, an air passage is formed through the rear housing motor cover, the mounting plate and the bulkhead for coupling air pressure therethrough and to a passage in the main body.

According to an embodiment, there is included a motor module, comprising;

a bulkhead adapted for fastening to a main body, said bulkhead including first and second bores therethrough for receiving motor drive shafts therein, and a third bore for receiving therein a cross slide motor mount shaft to which a motor is mounted, and including an air passage bore;

seals for sealing the motor drive shafts to said bulkhead;

a motor mounting plate, said motor mounting plate having first and second bores therein aligned with the first and second bores of said bulkhead, and including an air passage bore;

a ram motor mounted to said motor mounting plate;

a rotate motor mounted to said motor mounting plate; and     a rear housing motor cover in which said motor mounting plate and said bulkhead is inserted, said rear housing motor cover adapted for sealing to said main body.

In accordance with yet another feature of the invention, the condensation of moisture in the cutting machine either eliminated or substantially reduced by the use of insulation inserted or formed in the air passage which carries pressurized air through cutting machine.

According to a further feature of the invention, the air passage is insulated by inserting a tubular insulator therein to carry the air pressure, thereby reducing temperature changes in the adjacent metal parts of the cutting machine.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 3b is a sectional view of the main shaft taken along line 3b-3b of FIG. 3a;

FIG. 3c is a sectional view of the main shaft taken along line 3c-3c of FIG. 3a;

FIG. 10a-10c is a back view of the motor mounting plate;

DETAILED DESCRIPTION OF THE INVENTION

Figure 1:
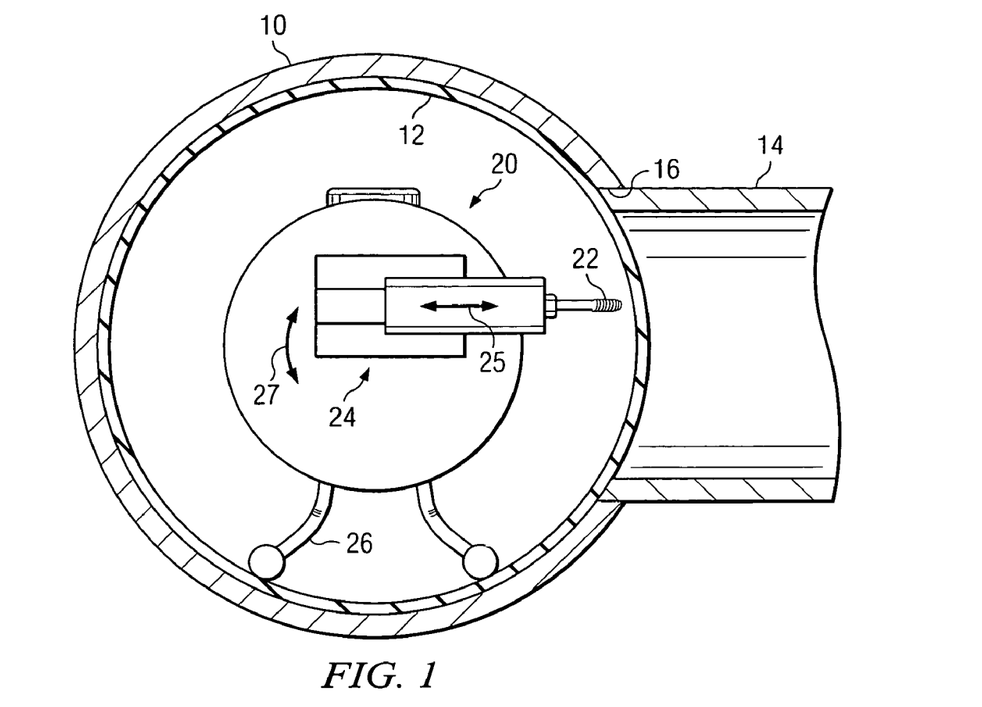
FIG. 1 is an end view of a main pipe lined with a liner, and connected to a lateral, with a cutting machine in a position to reinstate the lateral.

With reference to FIG. 1, there is shown an underground main 10 that has been retrofitted with a plastic sleeve or liner 12. The manner in which plastic sleeves 12 are installed in broken or deteriorated mains is well known in the art. Connected to the main 10 is a lateral pipe 14. The main 10 has an opening 16 therein in alignment with the lateral 14 so that the liquid can flow from the lateral 14 to the main 10. When the plastic sleeve 12 is cured in place in the main 10, the opening 16 is closed and must be reinstated by a cutting machine 20. The reinstatement cutting machine 20 is equipped with a bit 22 or other type of cutting device that is adapted for cutting the plastic material of the sleeve 12. The bit 22 is rotated by an air-driven motor, and is moved in a circular path by various movements imparted to the cross slide assembly 24 that holds the bit 22. As will be described below, the bit 22 is moved radially inwardly and outwardly by a male and female dovetail slide mounted on the cross slide assembly 24. The radial movements of the bit 22 are shown by arrow 25. The cross slide assembly 24 and thus the bit 22 are rotated about the longitudinal axis of the reinstatement cutting machine 20 by rotation of a main shaft. The rotational movements of the cross slide assembly 24 and the bit 22 are shown by arrow 27. Lastly, the cross slide assembly 24 and the cutting bit 22 are moved axially along the length of the reinstatement cutting machine 20 by axial movements of the main shaft via a threaded spline arrangement to be described below. The longitudinal or axial movements of the cross slide assembly 24 and the bit 22 would be in and out of FIG. 1. Accordingly, the bit 22 can be moved in three different planes in order to cut a circular opening in the plastic sleeve 12, all without moving the reinstatement cutting machine 20 itself. The reinstatement cutting machine 20 may be on the order of seventy pounds, or heavier, and thus remains steady in the plastic liner 12 during the cutting operation.

Figure 2:
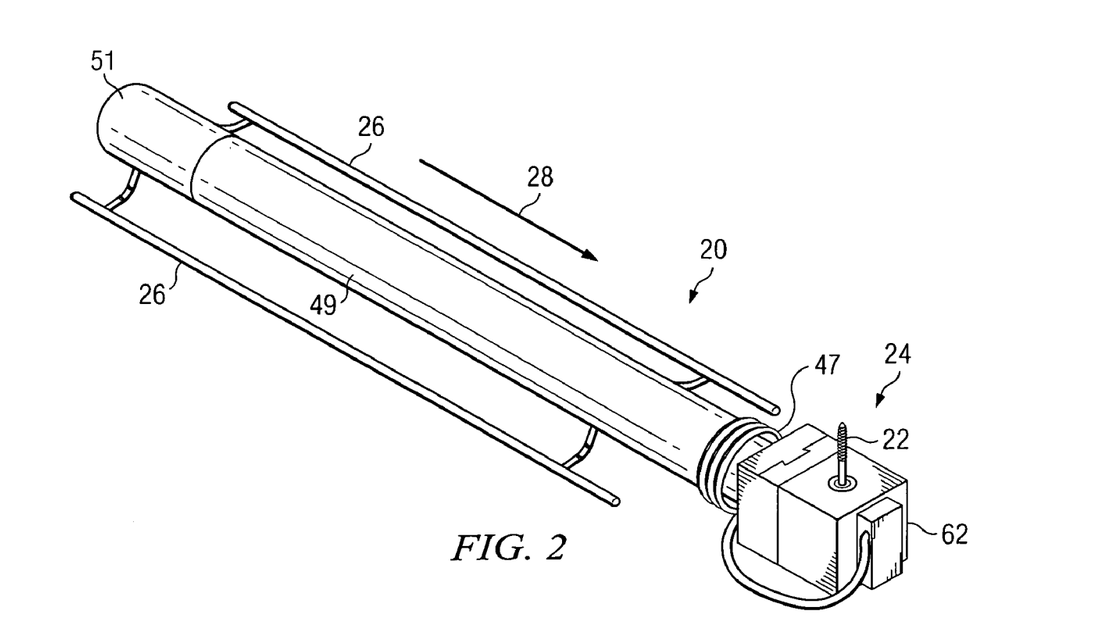
FIG. 2 is a view of the various parts of the cutting machine embodying various features of the invention.

The reinstatement cutting machine 20 is moved along the plastic liner 12 by a pair of skids, one shown as reference character 26. The reinstatement cutting machine 20 can be moved along the plastic liner 12 by pulling the same behind a video camera. The reinstatement cutting machine 20 could of course be self-propelled and moved under its own power. It is typical that the reinstatement cutting machine 20 be accompanied by a camera or other video equipment to remotely monitor and control the cutting process. The video equipment as well as pressurized air hoses, electrical umbilical cords and other cords can be towed by the reinstatement cutting machine 20 as it is being pulled through the main 10 by the cable. FIG. 2 is a view of the reinstatement cutting machine 20 that can be pulled in a main 10 in the direction of the arrow 28. In this instance, the reinstatement cutting machine 20 could be towed either by a self-propelled video camera, or by cables. In other instances, the reinstatement cutting machine 20 could move in a direction opposite that indicated by arrow 28, and tow the video camera. Tow cables can be connected to the reinstatement cutting machine 20 either to the back end thereof, or to the cross slide assembly 24.

The reinstatement cutting machine 20 includes a two-part housing constructed from a billet of stainless steel. The two-part housing includes a main body 49 for supporting therein a ram and rotate/feed assembly 30 (shown in FIG. 3a), and includes a motor mount and drive bulkhead 51 for supporting the three DC motors therein. The motor mount and drive bulkhead 51 is bolted to the main body 49 and sealed thereto with an o-ring, or other suitable sealing mechanism. While not shown, a water proof electrical connector is attached to the back end of the motor mount and drive bulkhead 51. The electrical connector provides a connection between an umbilical electrical cord and the three DC motors mounted in the motor mount and drive bulkhead 51. Also mounted to the back of the motor mount and drive bulkhead 51 is an air pressure connection for connecting to an umbilical air hose. The air pressure connection is connected to a sealed passage formed through the motor mount and drive bulkhead 51 and through the main body 49. The sealed passage in the two-part housing terminates in a connection at the front of the main body 49. An coiled air hose 47 is connected to the passage in the two-part housing of the reinstatement cutting machine 20 and to the cross slide assembly 24. As noted above, the pressurized air is utilized to drive the air-driven motor 62 of the cross slide assembly 24 which, in turn, rotates the bit 22 at a high RPM. As will be described more fully below, the cross slide assembly 24 can be moved axially in and out of the main body 49, much like the plunger of a hydraulic cylinder, or rotated in an angular manner about the longitudinal axis of the main body 49. This movement in two directions can be employed to correspondingly move a tool fixed to the end of the main shaft 42. In addition, the cross slide assembly 24 includes a part to which a tool, such as the cutting motor 62 is fastened, that moves in a radial direction along the axis of the bit 22. Accordingly, three degrees of movement of the bit 22 are also provided.

Figure 3A:
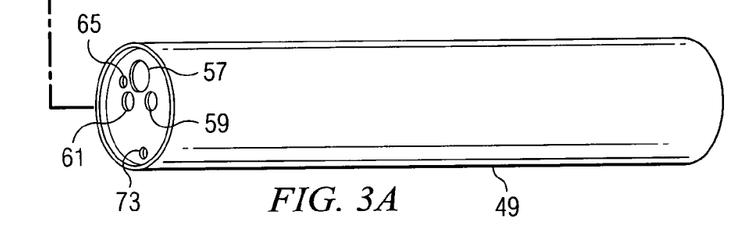
FIG. 3a is an exploded view of some of the components of the ram and rotate/feed assembly constructed according to the invention.

In accordance with an important feature of the invention, the cross slide assembly 24 and the bit 22 are mounted to the ram and rotate/feed assembly 30, shown in FIG. 3a. The cross slide assembly 24 is described in more detail below. The ram and rotate/feed assembly 30 includes a ram axis gear tube 32 having external gear teeth 34 formed at a rear end thereof. The gear teeth 34 of the ram axis gear tube 32 mesh with a ram drive gear shaft 36. The ram drive gear shaft 36 is driven by a reversible DC motor mounted in the motor mount and drive bulkhead 51. As will be described more fully below, the rotational movements of the ram axis gear tube 32 produces axial movements of the main shaft 42, and thus corresponding axial movements of the cross slide assembly 24 and bit 22. In FIG. 1, the axial movements of the main shaft 42 within the ram axis gear tube 32 causes movement of the bit 22 in and out of the drawing of FIG. 1. The ram axis gear tube 32 includes an opening 19 in the rear end thereof. A needle bearing is fixed within the opening 19 to provide a bearing support to the end of the ram axis gear tube 32. The needle bearing engages with a tubular support fixed to the motor mount and drive bulkhead 51.

The ram axis gear tube 32 also has a bore formed therethrough. A cross slide motor mount shaft 70 (FIG. 6b) is inserted into the bore of the ram axis gear tube 32. The ram axis gear tube 32 of FIG. 3a is constructed with a threaded nut 45 fixed to the front end thereof in the manner of a spanner nut. That is, the threaded nut 45 has a certain degree of wobble with respect to the ram axis gear tube 32. As the ram axis tear tube 32 is rotated by the ram drive shaft 36, the threaded nut 45 is carried with it. The internal threads of the threaded nut 45 mesh with threads 48 formed on a splined portion of a main shaft 42. Accordingly, when the ram axis gear tube 32 is rotated, the main shaft 42 is telescopically moved in and out of the ram axis gear tube 32. A ball bearing thrust washer 43 is positioned between the threaded nut 45 and the main shaft rotation gear 46. Another similar thrust bearing is located on the other side of the main shaft rotation gear 46 and abuts against a shoulder formed internal in the main body 49. The main shaft rotation gear 46 is thus constrained from axial movement, but is rotatable by the ram rotate shaft 52.

Figure 3B:
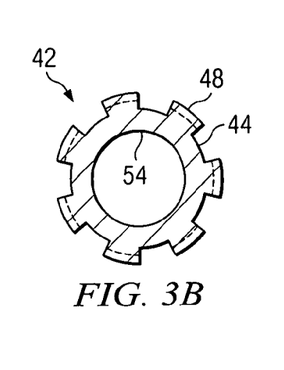

As noted above, the main shaft 42 is constructed with external splines 44, as well as acme threads 48 formed on the splines 44. Threads other than the acme type can be utilized. The main shaft 42 is thus constructed with longitudinal splines 44, and with acme threads 48 formed on the splines. This is also shown in FIG. 3b. The splines 44 allow the main shaft 42 to be rotated independently of the ram axis gear tube 32. As noted above, the rotational movement of the main shaft 42 is achieved by rotation of a main shaft rotation gear 46. The main shaft rotation gear 46 has internal splines 39, as shown by the side view of FIG. 3d. The internal splines 39 of the main shaft rotation gear 46 mate with the external splines 44 of the main shaft 42. The main shaft rotation gear 46 also has external gear teeth 50 formed therearound. The external gear teeth 50 of the main shaft rotation gear 46 mate with the ram rotate gear shaft 52. The ram rotate gear shaft 52 is driven by a DC motor (not shown) mounted in the motor mount and drive bulkhead 51. The motor mount and drive bulkhead 51 is bolted to the left end of the main body 49, shown in FIG. 3a.

The rotation of the main shaft rotation gear 46 causes rotational movement of the main shaft 42 as well as the cross slide assembly 24 fastened thereto. Thus, when the main shaft rotation gear 46 is rotated, the bit 22 moves clockwise or counterclockwise according to arrow 27 of FIG. 1, much like the hand of a clock. The angular movements of the bit 22 are effective to form vertical cuts in the plastic sleeve 12. It can be seen that the ram and rotate/feed assembly 30 is constructed in an efficient manner to provide two-axis movements of the bit 22, corresponding to axial and rotational movements. The outer end of the main shaft 42 includes a hollow part 53 and a reduced diameter hollow stub 55. As will be described below, the cross slide assembly 24 is mounted to the stub 55 of the main shaft 42.

Figure 3C:
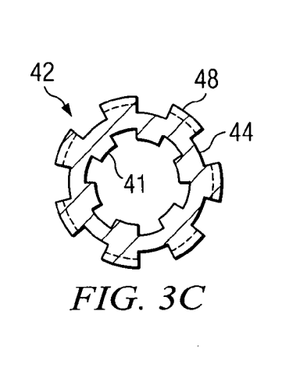
Figure 3D:
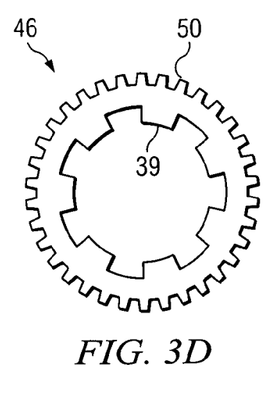
FIG. 3d is an end view of the main shaft rotation gear.

The main shaft 42 is constructed with a bore 54 therethrough. A substantial length of the main shaft 42, including the front end thereof, is constructed as shown in FIG. 3*b*. The back end of the main shaft 42 is constructed with internal splines, as shown in FIG. 3*c*. The bore 54 shown in FIG. 3*b* receives therein a cross slide motor mount tubular member 70, shown in FIG. 6*b*. The cross slide motor mount tubular member 70 includes external splines mateable with the internal splines 41 of the main shaft 42. A motor shaft extends through the cross slide motor mount tubular member 70 and drives a linear gear 68 on the cross slide assembly 24. The DC motors referred to herein may be equipped with internal gear reduction apparatus to achieve the appropriate rotational speeds of the various gear shafts. As will be described below, the motor shaft is effective to move the cutting bit 22 radially, via the cross slide assembly 24, in the direction indicated by arrow 25 of FIG. 1.

Figure 4:
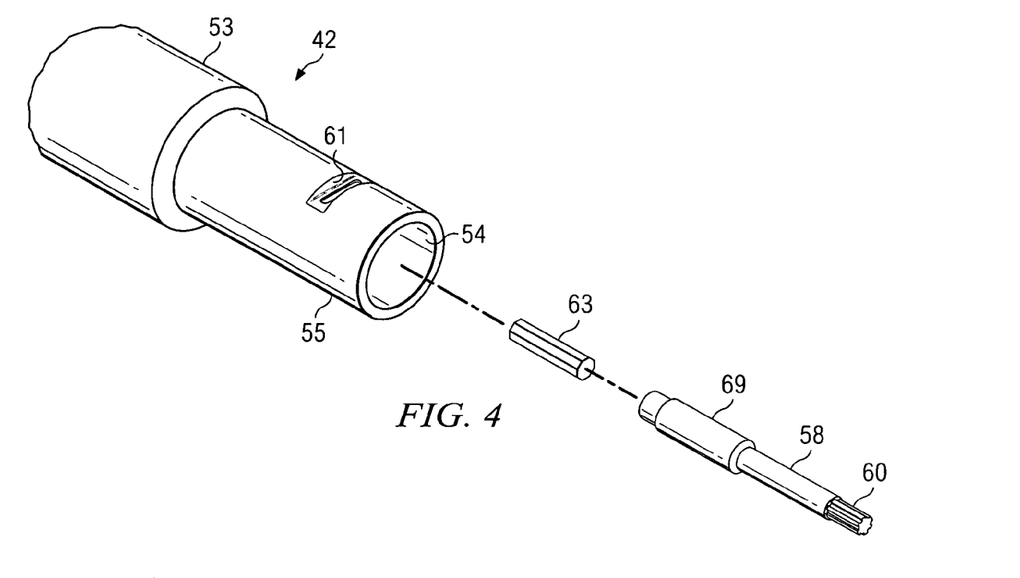
FIG. 4 illustrates an end of the main shaft with related components.

FIG. 4. Illustrates the details of the front end of the main shaft 42. The main shaft 42 includes a6 polished cylindrical surface 53 that slides within a seal formed in the main body 49 during axial movement of the main shaft 42. The stub 55 includes a recessed area 61 for receiving therein a bolt used for fastening the cross slide assembly 24 to the stub 55 of the main shaft 42. A hex rod 63 extends through the ram axis gear tube 32 and the main shaft 42 and is connected to a hex receptacle (not shown) in a pinion gear 60. The pinion gear 60 includes a bearing area 69. A pair of bearings held within the internal bore 54 of the stub 55 support the pinion gear 60 during rotation. The pinion gear 60 drives the cross slide assembly 24, shown in FIG. 5.

Figure 5:
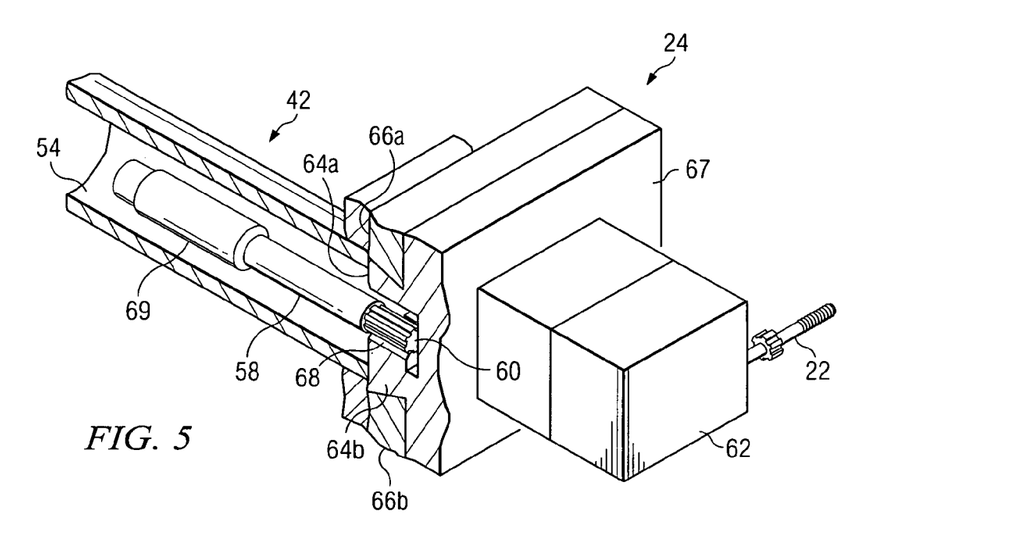
FIG. 5 is an isometric view of a cross slide assembly adapted for radially moving the air-driven motor and bit.

FIG. 5 illustrates the details of the cross slide assembly 24, a dove-tail part of which is moved in a radial direction with respect to the underground main 10. The cross slide assembly 24 includes a platform 67 to which the air-driven motor 62 is fixed. The air-driven motor 62 rotates the bit 22 at a high rate of speed. A chuck attached to the air-driven motor 62 holds the cutting bit 22. The platform 67 includes spaced-apart dove-tail rails 64*a* and 64*b* that mate with corresponding spaced-apart dove tail rails 66*a* and 66*b*. The dove-tail rails 66*a* and 66*b* are fixed to the stub end 55 of the main shaft 42 by other apparatus shown in FIG. 7*a*-7*c*. The mating dove-tail arrangement affords precision radial movements of the air driven motor 62 and the cutting bit 22. The platform 67 includes linear gear teeth 68 that mate with the teeth of the pinion gear 60. The teeth of the of the pinion gear 60 and the linear teeth 68 of the platform 67 function much like that of a rack and pinion assembly. Thus, as the radial drive motor 74 (FIG. 6*b*) is operated in either direction, the platform 67 and thus the air-driven motor 62 and bit 22 move radially in and out toward the wall of the plastic liner 12.

For the sake of completeness, the various movements of the cutting bit 22 are controlled by a remotely-located joystick and switch arrangement. The forward and backward movement of the joystick control the forward and backward movement of the main shaft 42, via the gear shaft 52. This controls the axial movement of the cross slide assembly 24 and the cutting bit 22. The left and right movements of the joystick control the rotational movements of the bit 22 along the arrow 27 of FIG. 1. A rocker type thumb-operated switch on the joystick controls the pinion gear 60 and thus the radial movements (arrow 25) of the bit 22 toward and away from the plastic liner 12. A trigger on the joystick can be operated by the index finger of the operator to control air pressure coupled to the air-driven motor 62. Thus, the movements of the bit 22 can all be accomplished with one hand of the operator.

Figure 8A:
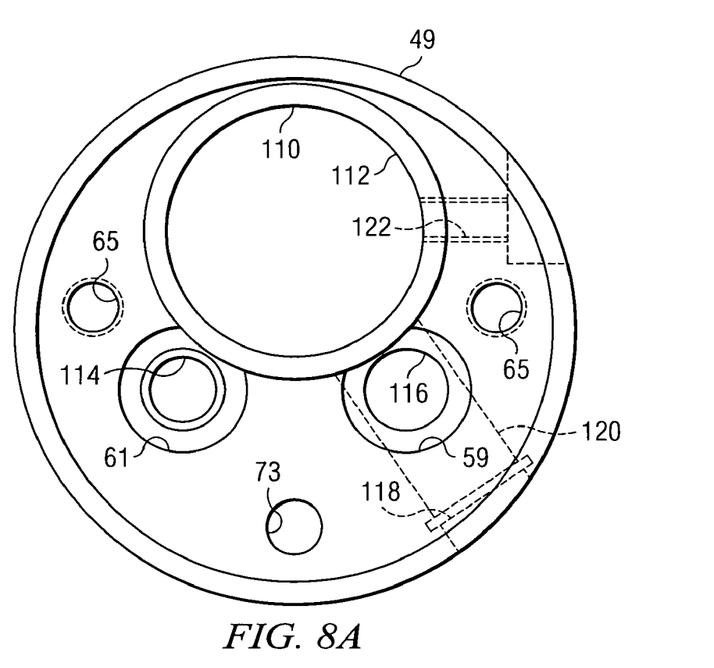
FIGS. 8a and 8b are respective rear and frontal views of the main body portion of the reinstatement cutting machine.
Figure 8B:
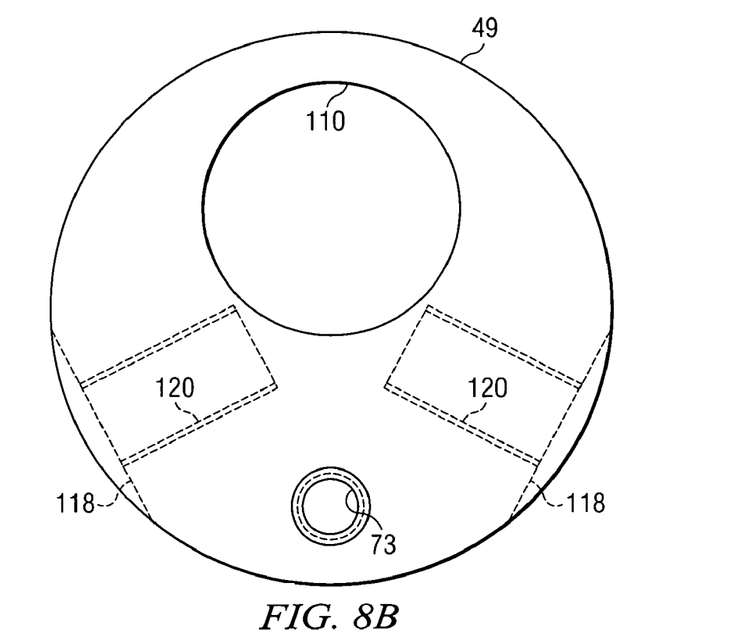

With reference back to FIG. 3*a*, the ram and rotate/feed assembly 30 is mounted in the main body 49 of the reinstatement cutting machine 20. The main body 49 is constructed from a cylinder of stainless steel with various holes bored therethrough. The main body 49 is bolted to a motor mount and drive bulkhead 51 (FIG. 2) which houses the three DC motors that drive respective gear shafts 36, 52 and 60. The ram and rotate/feed assembly 30 fits into a main bore 57 formed entirely through the main body 49. The ram drive shaft 36 and ram rotate shaft 52 fit through the respective bores 61 and 59. Formed through the main body 49 is a passage 63 for carrying air pressure to the air-driven motor 62. Two other threaded holes are formed in the main body, one shown as numeral 65, for bolting the motor mount and drive bulkhead 51 to the main body 49. The connection between the main body 49 and the motor mount and drive bulkhead 51 is sealed with one or more o-rings. The skids 26 of the reinstatement cutting machine 20 are mounted to the main body 49 and the motor mount and drive bulkhead 51. The main body 49 includes various internal bearings for allowing rotation of the ram axis gear tube 32 and the main shaft 42. The end structures of the main body 49 are shown in FIGS. 8*a* and 8*b*.

Figure 6A:
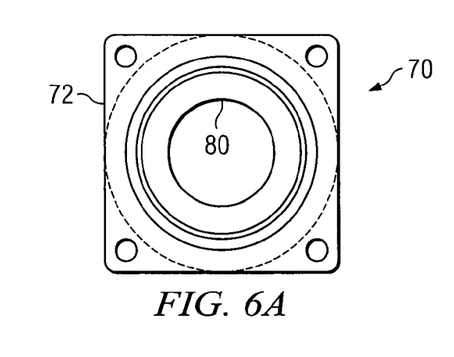
FIG. 6a is an end view of the cross slide motor mount shaft.
Figure 6B:
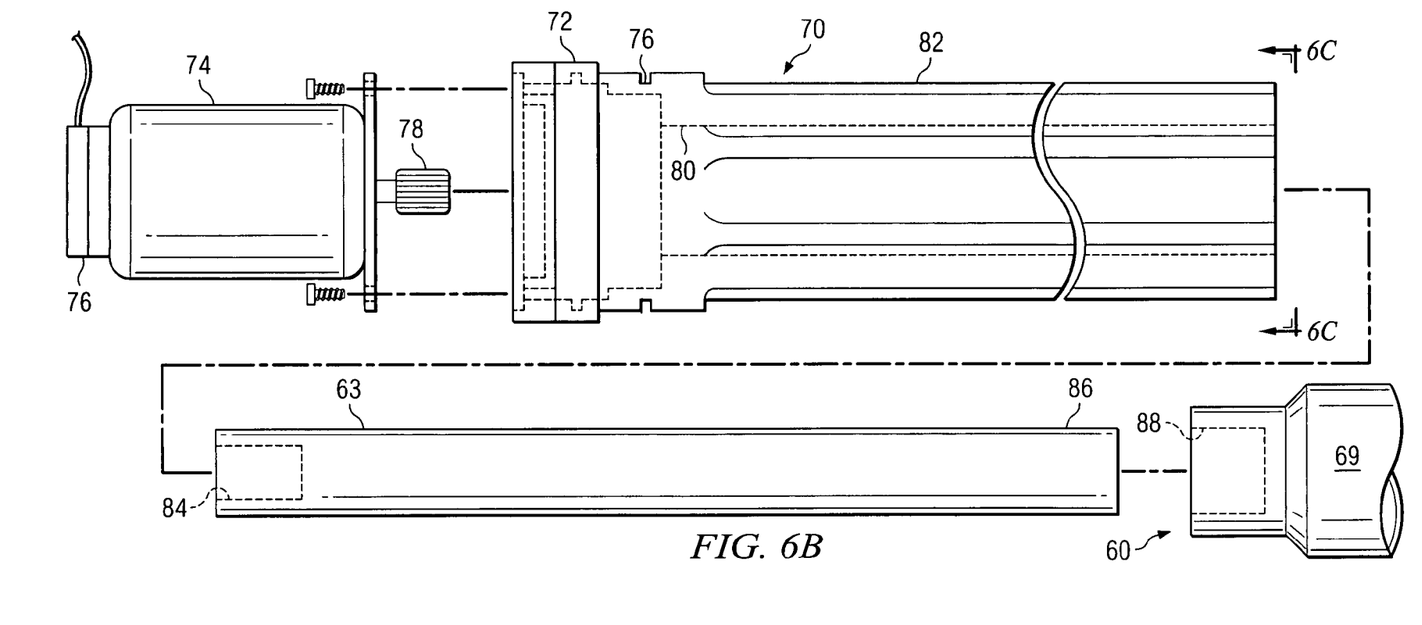
FIG. 6b is a side view of the various components associated with the cross slide motor mount shaft.

FIG. 6*a* illustrates an end view of the cross slide motor mount shaft 70 employed for driving the cross slide assembly 24. The cross slide motor mount shaft 70 includes a flange 72 to which the DC motor 74 is attached by screws, or the like. The DC motor 74 includes a slip ring arrangement 76 for coupling DC current to the motor 74. The DC motor 74 is fixed to the cross slide motor mount shaft 70, and thus when the shaft 70 is rotated by the main shaft 42, the DC motor 74 rotates with the cross slide motor mount shaft 70. In practice, the DC motor 74 is located in the motor mount and drive bulkhead 51. The cross slide motor mount shaft 70 includes an annular groove 76 for receiving an o-ring for sealing to the motor mount and drive bulkhead 51. The DC motor 74 drives the hex-shaped shaft 78 that extends through the ram and rotate/feed assembly 30. The motor 74 may be equipped with internal gear reduction apparatus.

Figure 6C:
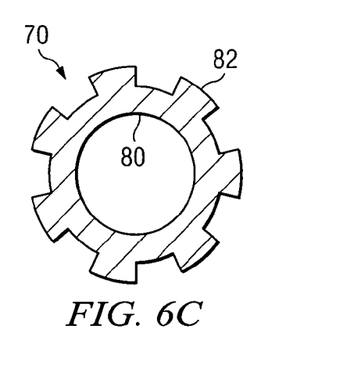
FIG. 6c is an end view of the cross slide motor mount shaft, taken along line 6c-6c of FIG. 6b.

The cross slide motor mount shaft 70 includes a bore 80 formed therethrough, and splines 82 formed externally, as shown in FIG. 6*c*. The external spines 82 mate with the internal splines 41 (FIG. 3*c*) formed in the rear portion of the main shaft 42. Extended through the bore 80 of the cross slide motor mount shaft 70 is the hex rod 63. The hex rod 63 has formed in an end thereof a hex receptacle 84 for receiving therein the hex shaft 78 of the motor 74. The other end 86 of the hex rod 63 fits within a hex receptacle 88 of the pinion gear 60. With this arrangement, the motor 74 drives the pinion gear 60 by way of the hex rod 63.

The advantage of allowing the DC motor 74 itself to rotate with the main shaft 42, is that this arrangement allows the cross slide assembly 24 to rotate about an axial axis without also moving the bit 22 in a radial direction. Otherwise, rotation of the main shaft 42 would alone cause corresponding rotation of the cross slide assembly 24 and thus relative movement between the pinion gear 60 and the linear gear 68 formed in the dove tail slide. This unintended relative movement between the pinion gear 60 and the linear gear 68 would thus cause the platform 60 of the cross slide assembly 24 to move somewhat and thus move the bit 22 in a radial direction. By moving the motor 74 with the main shaft 42 when the latter is rotated, the radial movement of the bit 22 is independent of the rotational movement of the cross slide assembly 24.

Figure 7A:
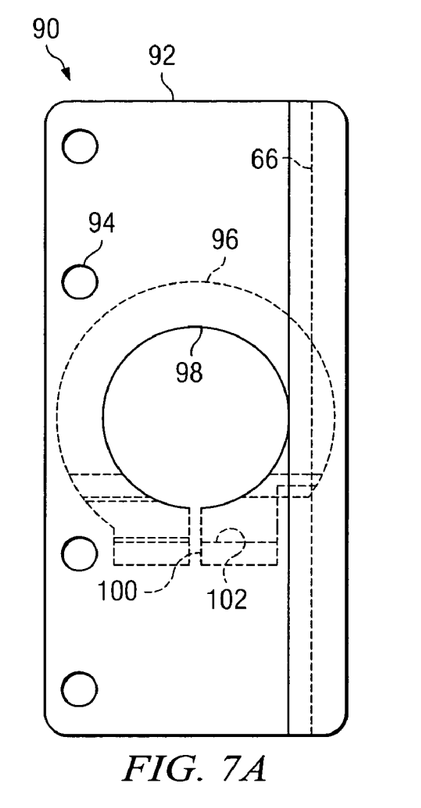
FIGS. 7a, b and c are respective frontal, side and end views of a part of the cross slide assembly that is fixed to the stub of the main shaft.
Figure 7B:
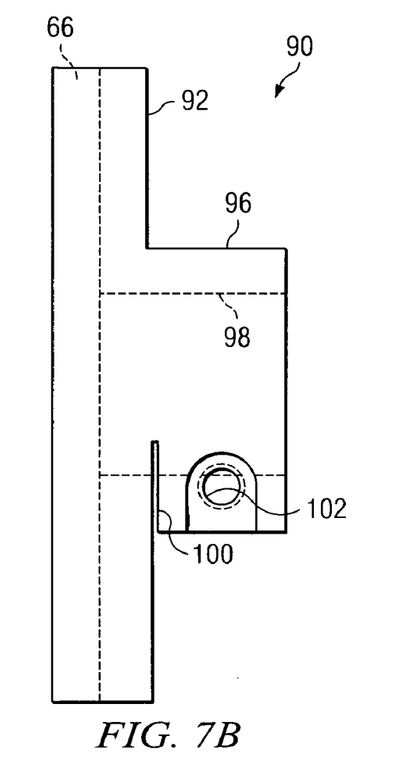
Figure 7C:
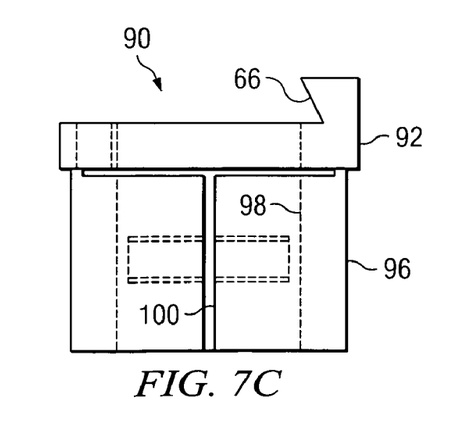

FIGS. 7*a*-7*c* illustrate the part of the cross slide assembly 24 that is fixed to the stub 55 of the main shaft 42. The cross slide mounting bracket 90 includes a plate 92 to which one dove tail 66 is formed. The other dove tail is not shown, but is a separate member bolted to the plate 90 by way of the bolt holes 94. Formed with the plate 92 is a collar 96 with a bore 98 formed therethrough. The collar 96 fits over the stub 55 of the main shaft 42. Cut in the collar 96 is a slot 100. A bolt hole 102 is formed in the collar 96 so that it passes through the slot 100. One portion of the bolt hole 100 is threaded, while the other part of the bolt hole 100 is not threaded. The bolt hole 100 is located in the collar 96 so that the bolt (not shown) also passes through the indention 61 formed in the stub 55 of the main shaft 42. The cross slide mounting bracket 90 is fastened to the main shaft 42 by slipping the collar 96 over the stub 55, passing a bolt through the unthreaded part of the bolt hole 102, through the indention 61 of the stub 55, and into the threaded part of the bolt hole 102. The bolt can be tightened to thereby squeeze the collar 96 and fix it onto the stub 55.

FIGS. 8a and 8b illustrates the detailed construction of the ends of the main body 49 that houses the ram and rotate/feed assembly 30. The main body 49 includes, as viewed from the rear (FIG. 8a), a large bore 110 through which the ram and rotate/feed assembly 30 is inserted. A shoulder 112 is formed in the main body 49 against which a ball bearing thrust washer abuts, and provides a thrust bearing for the main shaft rotation gear 46. The main body 49 is fastened to the motor mount and drive bulkhead 51 using the threaded bolt holes 65. The bore 61 receives the gear of the ram drive shaft 36, and the bore 59 receives the gear of the ram rotate shaft 52. The smaller bore 114 forms a bearing for the stub end of the ram drive shaft 36. Similarly, the smaller bore 116 forms a bearing for the stub end of the ram rotate shaft 52. The passage 73 couples pressurized air through the main body 49 from the front end to the back end thereof. Formed on the side of the main body 49 are flattened areas 118 into which threaded holes 120 are formed. The skids 26 of the reinstatement cutting machine 20 are bolted into the threaded holes 120. A grease fitting is fastened in a threaded hole 122 to allow the main shaft 42 to be greased.

The front of the main body 49 is illustrated in FIG. 8b. The bore 110 has installed therein a seal (not shown) through which the polished cylindrical part 53 of the main shaft 42 slides during axial movement of the cross slide assembly 24. Those skilled in the art will appreciate that there are various bearings and seals and other parts or apparatus which are not shown, but which would be apparent to those skilled in the art in order to make the reinstatement cutting machine 20 liquid tight.

While the foregoing describes the features of the invention embodied in a reinstatement cutting machine, the principles and concepts of the invention can be employed in many other machines and applications. In addition, not all of the various features need be used in a single application. To that end, the ram axis feed tube can be rotated by means other than the drive threads, such as friction drive, belt drive, chain drive direct drive, etc. The same is true of the drive of the main shaft. Moreover, the various inside and outside threads of the ram axis gear tube and the main shaft can in certain situations be located on the members at different locations. Those skilled in the art may prefer to mount the tool to be moved at locations other than at the stub end of the main shaft. Many other variations are possible without departing from the spirit of the invention.

Figure 9:
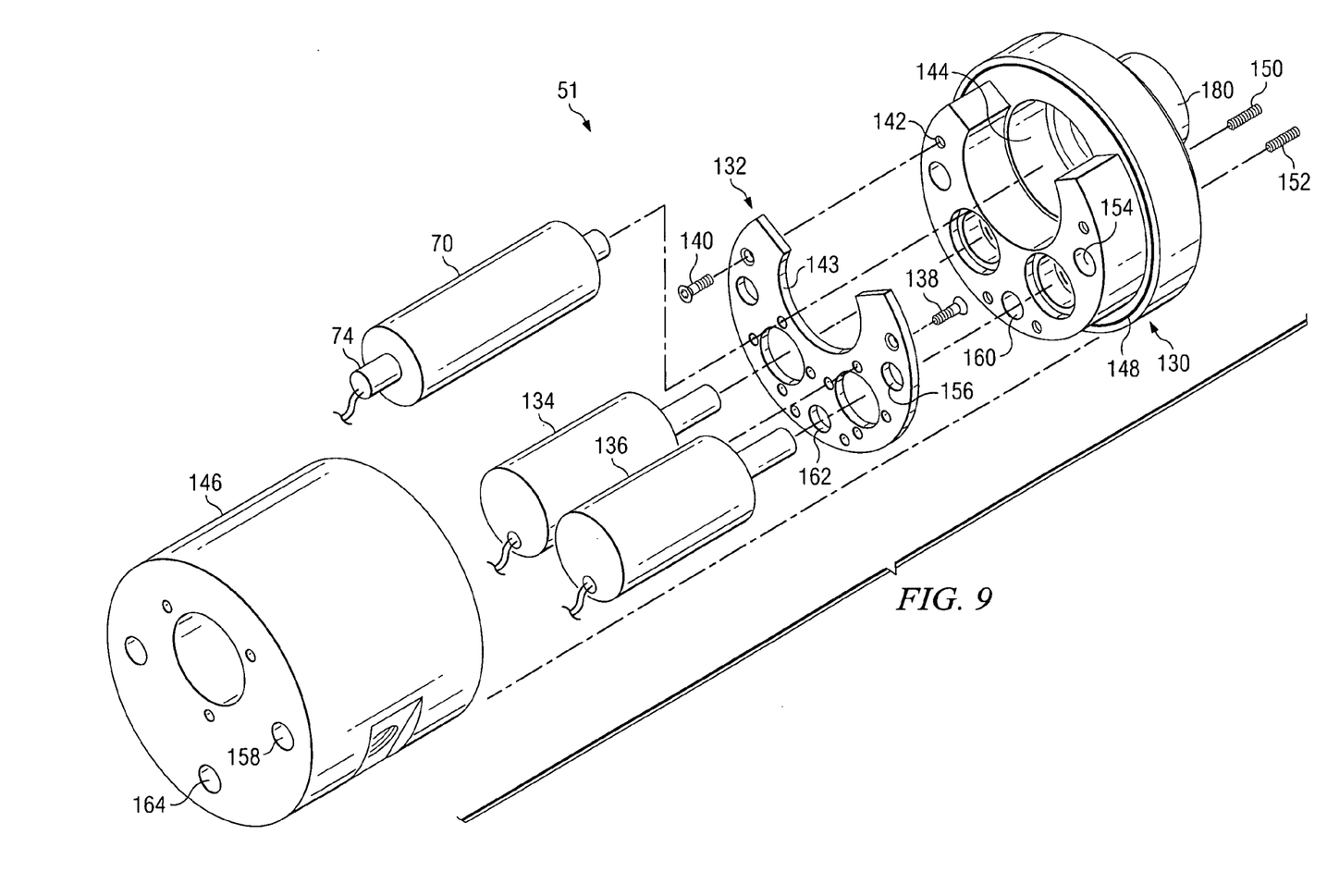
FIG. 9 is an exploded view of the motor mount and drive bulkhead.

With reference to FIG. 9, illustrated are the major components of the motor mount and drive bulkhead 51. As noted above, the motor mount and drive bulkhead 51 fastens to the back of the main housing 49. A bulkhead 130 is located adjacent to the main body 49. The bulkhead 130 is machined from a billet of stainless steel. A stainless steel motor mounting plate 132 is utilized for fastening thereto a ram motor 134 and a rotate motor 136. The ram motor 134 is effective to drive the ram drive gear shaft 36 (FIG. 3a), and the rotate motor 136 is effective to drive the ram rotate gear shaft 52. The ram motor 134 and the rotate motor 136 are each fastened to the motor mounting plate 132 by way of bolts 138. The motor mounting plate 132 is then fastened by bolts 140 to threaded holes 142 formed in the bulkhead 130.

The cross slide motor mount shaft 70 and associated cross slide motor 74 are inserted through the opening 143 of the motor mounting plate 132 and the opening 144 of the bulkhead 130. As will be described more fully below, the cross slide motor mount shaft 70 is sealed to the bulkhead 130 and rotatable therein.

A rear housing motor cover 146 is also machined from a billet of stainless steel, and is sealed to the bulkhead 130 by way of an o-ring 148. The rear housing motor cover 146 houses the motors 74, 134 and 138 and provides a sealed motor containment unit to the reinstatement cutting machine 20. An air passage for pressurized air is formed through the various components of the motor mount and drive bulkhead 51.

Bolted into the rear edge of the main body 49 are two threaded studs 150 and 152. The studs extend through holes 154 in the bulkhead 130, holes 156 in the motor mounting plate 132 and holes 158 in the rear housing motor cover 146. Nyloc sealing nuts (not shown) are screwed onto the protruding ends of the studs 150 and 152 to compress the annular edge of the rear housing motor cover 146 onto the bulkhead 148, with the o-ring 148 therebetween.

In order to accommodate the passage of pressurized air through the reinstatement cutting machine 20, a first passageway is formed through the various components of the motor mount and drive bulkhead 51. To that end, an air passage bore 164 is formed through the rear housing motor cover 146. A corresponding air passage bore 162 is formed through the motor mount plate 132, and an air passage bore 160 is formed through the bulkhead 130. Lastly, a second air passage bore 73 is formed through the main housing 49. Annular grooves are formed in the back face of the motor mounting plate 132, in the back face of the bulkhead, and in the back face of the main body 49 to accommodate respective o-ring seals. Accordingly, when the rear housing motor cover 146, the motor mounting plate 132, the bulkhead 130, and the main body 49 are all assembled together and fastened into a compressed unit, the o-rings along the air pressure passage are compressed and form respective seals so that the air pressure does not enter the internal cavities of the reinstatement cutting machine 20.

Figure 10A:
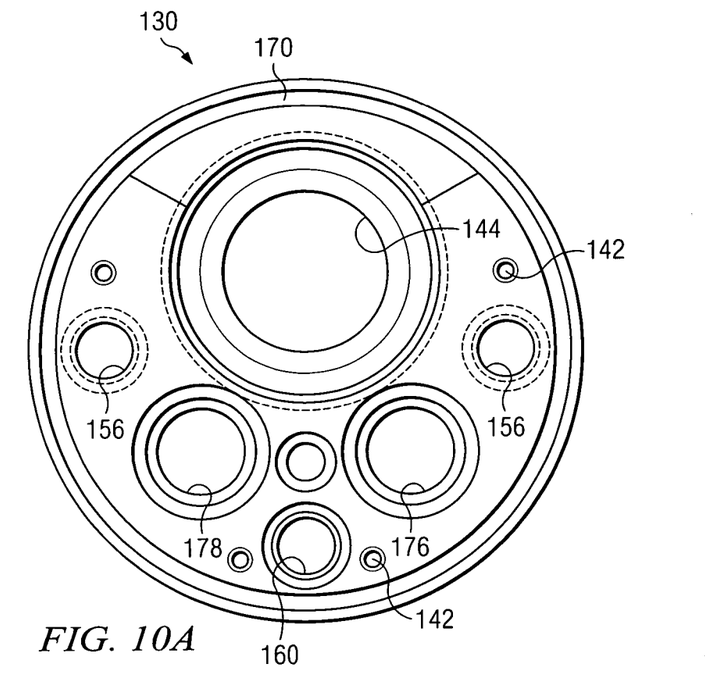
FIGS. 10a-10c are respective back, side and frontal views of the bulkhead.
Figure 10B:
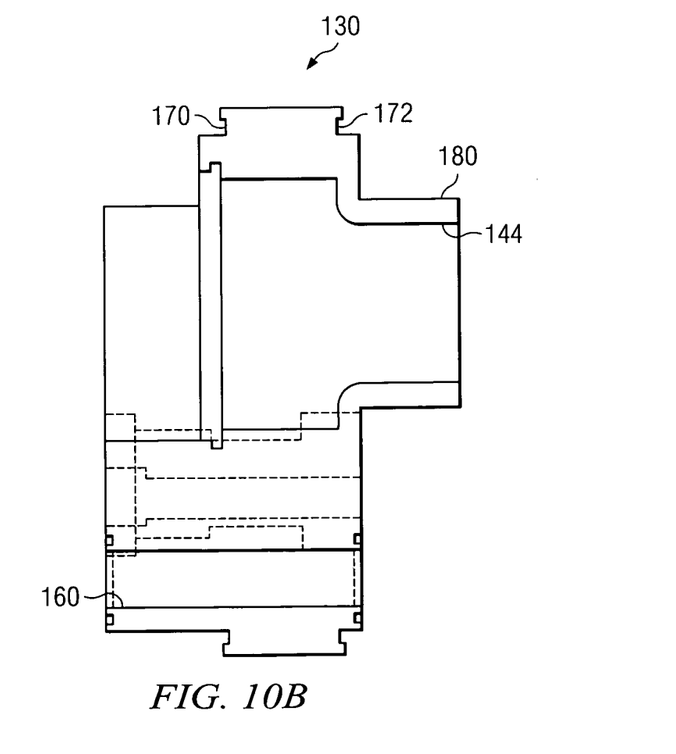
Figure 10C:
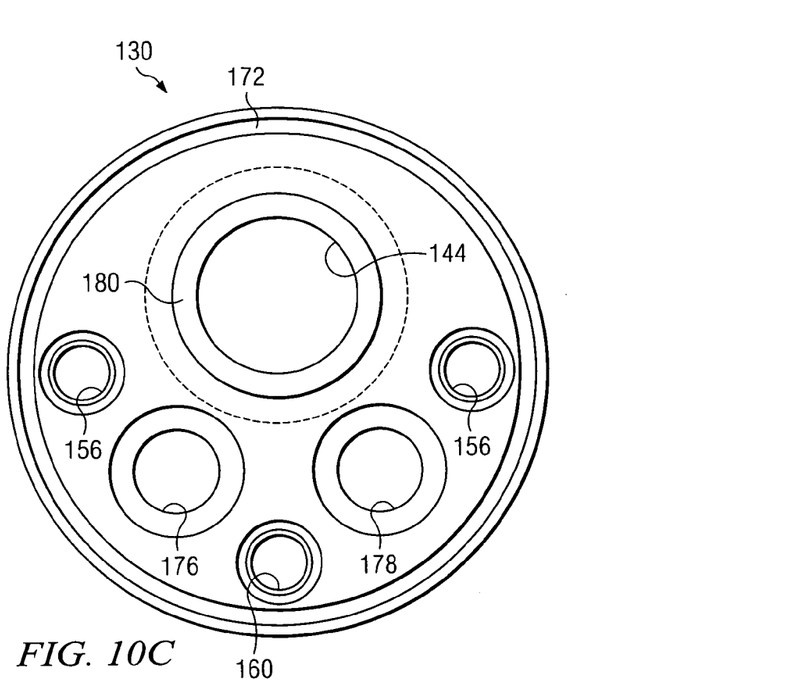

FIGS. 10a-10c illustrate the details of the bulkhead 130. The bulkhead 130 includes opposing o-ring grooves 170 and 172 for sealing the rear housing motor cover 146 to the bulkhead 130, and for sealing the bulkhead 130 to the main body 49. Included also is a bore 144 for receiving therein the cross slide motor mount shaft 70. The bore 144 is also constructed to accept a bearing and a double lip seal (not shown) for sealing to the cross slide motor mount shaft 70. As described above, the cross slide motor 74 and the cross slide motor mount shaft 70 both rotate in the bulkhead 130. The cross slide motor mount shaft 70 is maintained rotational, but axially fixed to the bulkhead 130 with snap rings.

The bulkhead 130 has formed therein a bore 176 for receiving a needle bearing and a double lip seal for sealing the ram rotate gear shaft 52. Similarly, a bore 178 includes a corresponding needle bearing and a double lip seal to seal to the ram drive gear shaft 36. Respective male hex ends of the shafts of the motors 134 and 136 are inserted into the respective hex receptacles of the ram drive gear shaft 36 and the ram rotate gear shaft 52. The studs 150 and 152 of the main body 49 are received through the bores 156. The stud bores 156 each have o-ring grooves on the main body side thereof. Four smaller threaded holes 142 are used to bolt the motor mounting plate 132 to the bulkhead 130. An air passage bore 160 is formed in the bulkhead 130. An o-ring groove encircles the air passage bore 160 on both sides of the bulkhead 130. A tubular snout 180 is formed around the bore 144. The snout 180 is inserted into the needle bearing fixed in the opening 19 of the ram axis gear tube 32.

Figure 10D:
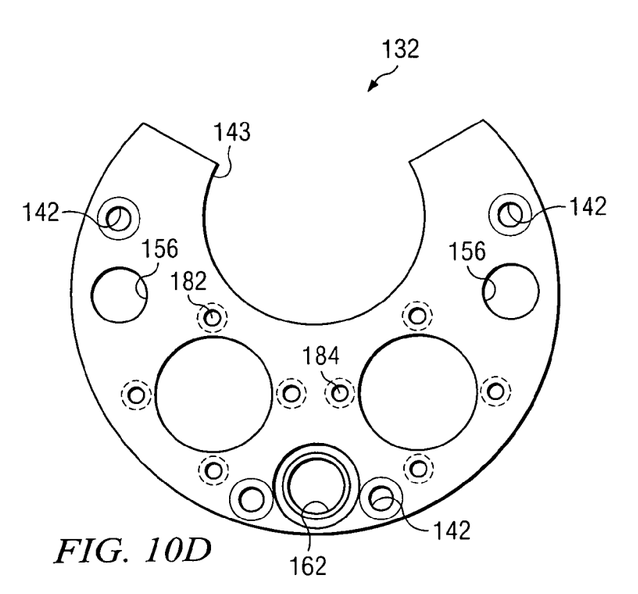
FIG. 10d is a back view of the motor mounting plate.

FIG. 10d is an end view of the motor mounting plate 132. The ram motor 134 is fastened to the motor mounting plate 132 by passing small bolts through the four holes 182 into the motor 134. The rotate motor 136 is similarly fastened to the motor mounting plate 132 using the four bolt holes 184. An air passage bore 162 is formed in the motor mounting plate 132. The air passage bore 162 has an o-ring groove therearound on the rear housing motor cover side.

Figures 10E, 10G:
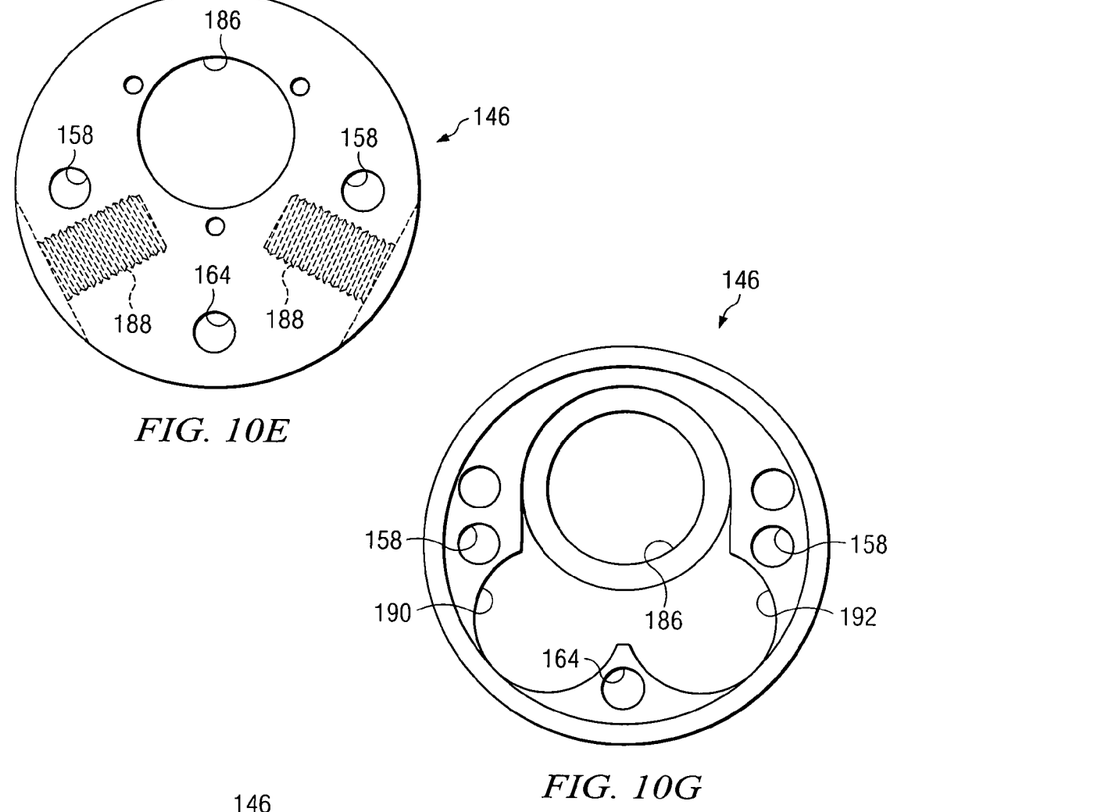
FIGS. 10e-10g are respective back, side and frontal views of the rear housing motor cover.
Figure 10F:
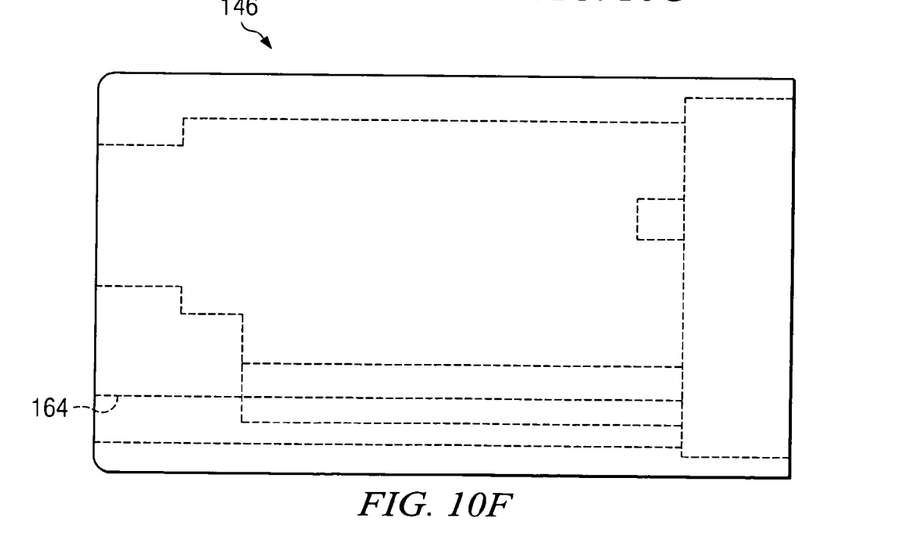

FIGS. 10e-10g illustrate the details of the rear housing motor cover 146 which is machined from a billet of stainless steel. The rear end of such cover 146 is shown in FIG. 10e. The bore 186 is for fastening thereto an electrical cable connector for carrying electrical signals to the three motors 74, 134 and 136. The connector is sealed in a conventional manner to the rear housing motor cover 146. The two threaded holes 188 are used for fastening the cutting machine skids 26 thereto. The stud bores 158 receive therethrough the stud bolts 150 and 152 of the main body 49. The cutouts 190 and 192 receive the respective motors 134 and 136.

Figure 11:
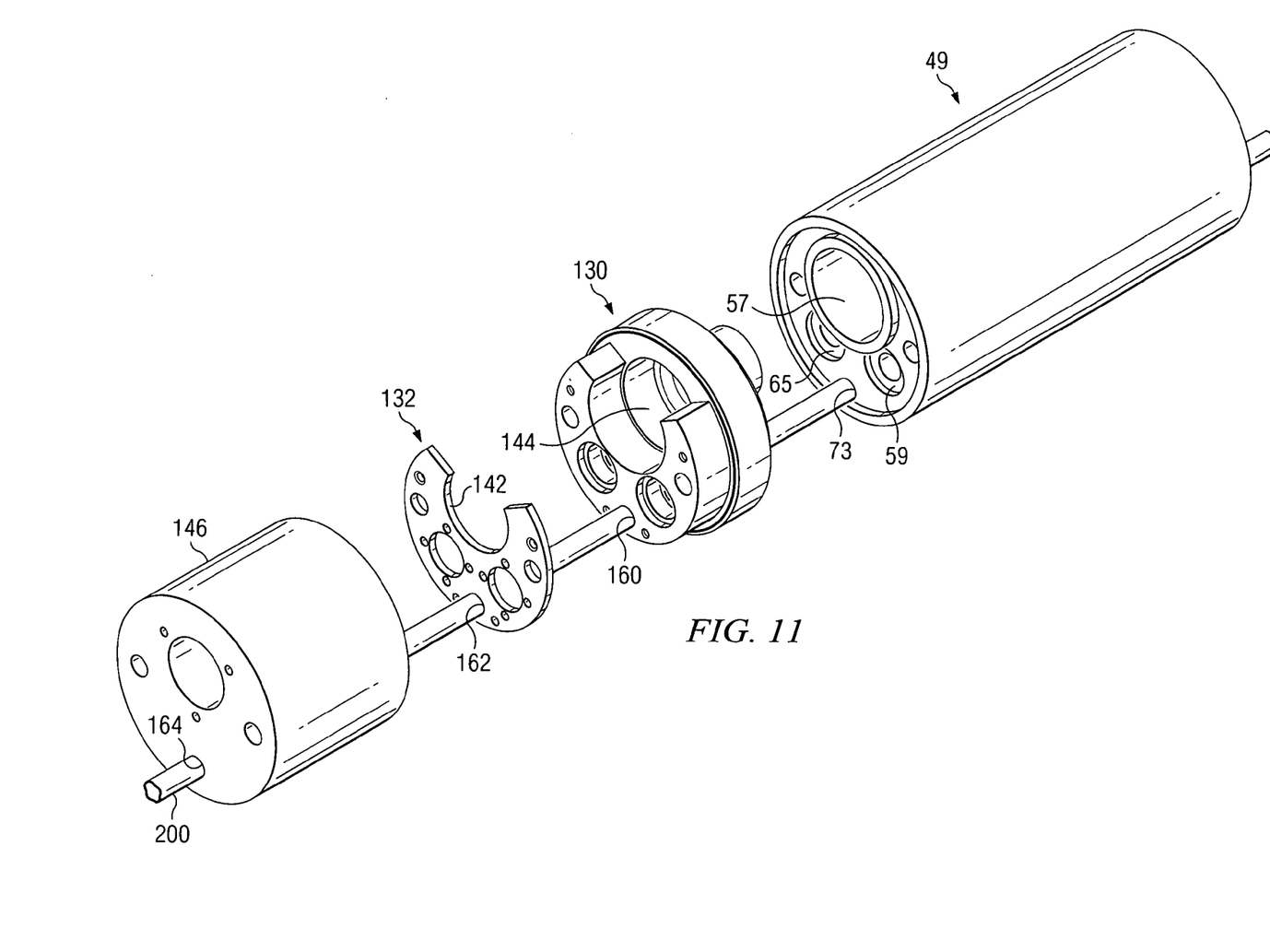
FIG. 11 is an exploded view of the rear housing motor cover, the motor mounting plate, the bulkhead, the main body and an insulator tube inserted into the air passage.

Referring now to FIG. 11, there is illustrated another feature of the invention. The rear housing motor cover 146, the motor mounting plate 132, the bulkhead 130 and the main body 49 are shown prior to assembly together. Also illustrated are the respective air passagebores 164, 162, 160 and 73 aligned with each other. As described above, the interfaces of the stainless steel components 146, 132, 130 and 49 around the air passage bores are sealed with o-rings, or other suitable seals. In order to prevent temperature changes of the nature that will cause condensation of moisture in the cavities of the reinstatement cutting machine 20, the air passage therethrough is insulated.

In the preferred embodiment of the invention, an insulating tube 200 is inserted into the air passage formed through the rear housing motor cover 146, through the motor mounting plate 132, the bulkhead 130 and the main body 49. Preferably, the insulating tube 200 is constructed of a graphite impregnated TEFLON synthetic polymer material, as such material exhibits excellent temperature insulating properties. The outside diameter of the heat insulating tube 200 is only slightly smaller than the diameter of the air passage bores so as to provide an insulating lining to the air passages. In the preferred embodiment, the sidewall thickness of the heat insulating tube 200 is about 0.05 inches, which provides sufficient rigidity so that the tube 200 can be inserted all the way through the respective air passage bores formed in the stainless steel components of the cutting machine 20.

The insulating tube is of a length somewhat longer than the two-part body of the reinstatement cutting machine 20. The insulating tube 200 protrudes from each end of the cutting machine 20 about one eighth inch. When a brass air hose fitting is screwed into the threaded ends of the respective air passage bores of the main body 49 and the rear housing motor cover 146, the end of the insulating tube 200 is deformed sufficiently as to provide an adequate restriction so that air does not enter between the outside wall of the tube 200 and the sidewall of the air passage bores formed in the stainless steel body components.

While the preferred embodiment utilizes an insulating tube, those skilled in the art may find that other techniques can be employed for insulating the air passage. For example, the inside surface of the metallic air passage can be coated with an insulating material, such as by painting the surface, deposition of a material on the metallic surface, melting an insulating material on the surface, etc. Also, insulating materials, such as a glass-filled nylon tube can be utilized. Many other types or insulating materials can be used with equal effectiveness.

While the preferred and other embodiments of the invention have been disclosed with reference to specific cutting machine structures, it is to be understood that many changes in detail may be made as a matter of engineering choices without departing from the spirit and scope of the invention, as defined by the appended claims.

What is claimed is:

1. In a reinstatement cutting machine of the type having an elongated metal body movable through a pipe to be reinstated, said elongated metal body having a longitudinal axis, a rearmost end and a forward-most end, a cutting head mounted to the forward-most end of said elongated metal body, said cutting head including a cutting bit for cutting the pipe and an air-driven motor for driving the cutting bit, the improvement in the reinstatement cutting machine comprising:

an elongated bore formed through the elongated metal body from the rear-most end to the forward-most end thereof so that said elongated bore has a length substantially the same length as said elongated metal body;

an elongated insulator for insulating the elongated bore to reduce temperature changes in the elongated metal body as a result of the air carried through the elongated insulator, said elongated insulator for carrying pressurized air through the elongated metal body of said reinstatement cutting machine; and a motor for moving said cutting head axially with respect to the longitudinal axis of the elongated metal body of said reinstatement cutting machine, said motor located within said elongated metal body and outside of said elongated bore formed through the elongated metal body.

2. The improvement in the reinstatement cutting machine of claim 1, wherein said elongated metal body includes plural body components where each body component includes a respective bore aligned with each other.

3. The improvement in the reinstatement cutting machine of claim 2, further including a seal between two said body components, said seal around the respective ends of the bores of the two body components.

4. The improvement in the reinstatement cutting machine of claim 2, wherein said elongated insulator comprises a single tube constructed of an insulating material that is inserted through the respective bore of the plural body components.

5. The improvement in the reinstatement cutting machine of claim 2, wherein said elongated metal body is constructed of a billet of stainless steel with said body components formed therefrom, and said elongated bore comprises respective bores formed through each said body component.

6. The improvement in the reinstatement cutting machine of claim 1, wherein said elongated insulator comprises a tube adapted for insertion into the elongated bore of the elongated metal body of the reinstatement cutting machine.

7. The improvement in the reinstatement cutting machine of claim 6, wherein said tube has a sidewall thickness of about 0.05 inches.

8. The improvement in the reinstatement cutting machine of claim 1, wherein said elongated insulator is formed of a graphite impregnated insulating material.

9. The improvement in the reinstatement cutting machine of claim 1, further including a flexible hose for coupling pressurized air from the elongated insulator to the air-driven motor.

10. The improvement in the reinstatement cutting machine of claim 1, wherein a portion of said elongated metal body houses a feed assembly for moving said cutting head axially with respect to a longitudinal axis of said pipe to be reinstated.

11. A reinstatement cutting machine, comprising:
- an elongated metal body having a longitudinal axis and adapted for passing through a pipe to be reinstated;
- a cutting head mounted to the elongated metal body, and said cutting head movable to cut an opening in the pipe;
- a portion of said elongated metal body housing a feed assembly for moving said cutting head axially with respect to said longitudinal axis;
- an air-driven motor adapted for driving a bit for cutting the pipe opening, said air-driven motor mounted to said cutting head;
- a bore formed all the way through said elongated metal body of the reinstatement cutting machine, said bore having an insulated lining slightly smaller than an inner cylindrical surface of said bore so that pressurized air is carried through the insulated lining of the elongated metal body to said air-driven motor; and
- a motor cavity for a motor for axially moving said cutting head formed in the elongated metal body of said reinstatement cutting machine, said motor cavity located radially outside said insulated bore, whereby the pressurized air passing through the insulated bore does not cause temperature changes to be conducted through the elongated metal body that would cause condensation in said motor cavity.

12. The reinstatement cutting machine of claim 11, further including a flexible air pressure hose connecting an end of said bore at a forward end of said elongated metal body to said air-driven motor.

13. The reinstatement cutting machine of claim 11, wherein said bore is lined with said insulated lining to minimize temperature changes in said metal body with the passage of air through the bore.

14. The reinstatement cutting machine of claim 13, wherein said insulated lining comprises a tubular member adapted for insertion into the bore of said elongated metal body.

15. A reinstatement cutting machine, comprising:
- an elongated metal body having a longitudinal axis and adapted for passing through a pipe to be reinstated;
- a cutting head mounted to the elongated metal body, and said cutting head movable to cut an opening in the pipe;
- a portion of said elongated metal body housing a feed assembly for moving said cutting head axially with respect to said longitudinal axis;
- an air-driven motor adapted for driving a bit for cutting the pipe opening, said air-driven motor mounted to said cutting head;
- an air passage bore formed all the way through said elongated metal body of the reinstatement cutting machine; and
- an insulated lining that lines an inner cylindrical surface of said air passage bore so that pressurized air is carried through the insulated lining of the elongated metal body to said air-driven motor; and
- a motor cavity in the elongated metal body for a motor for moving the cutting head axially, said motor cavity located radially outside said insulated air passage bore.

16. The reinstatement cutting machine of claim 15, wherein each end of said insulated lining is fixed to the elongated metal body.

17. The reinstatement cutting machine of claim 15, wherein said insulated lining has a sidewall thickness of about 0.05 inches.

\* \* \* \* \*